(12) United States Patent
Geringer et al.

(10) Patent No.: US 12,090,436 B2
(45) Date of Patent: Sep. 17, 2024

(54) VALVE PROTECTION AND TUBE MANAGEMENT DEVICE

(71) Applicant: EMD Millipore Corporation, Burlington, MA (US)

(72) Inventors: Joseph Geringer, Merrimack, NH (US); Robert Castro, Wildomar, CA (US); Martin Szyk, Worcester, MA (US); Sophie Daudenarde, Arlington, MA (US); Joseph Almasian, Westford, MA (US)

(73) Assignee: EMD Millipore Corporation, Burlington, MA (US)

( * ) Notice: Subject to any disclaimer, the term of this patent is extended or adjusted under 35 U.S.C. 154(b) by 0 days.

(21) Appl. No.: 18/165,543

(22) Filed: Feb. 7, 2023

(65) Prior Publication Data

US 2023/0182058 A1  Jun. 15, 2023

Related U.S. Application Data

(63) Continuation of application No. 16/328,640, filed as application No. PCT/US2017/049075 on Aug. 29, 2017, now Pat. No. 11,602,709.
(Continued)

(51) Int. Cl.
*B01D 46/42* (2006.01)
*B01D 46/00* (2022.01)

(52) U.S. Cl.
CPC ..... *B01D 46/4272* (2013.01); *B01D 46/0004* (2013.01)

(58) Field of Classification Search
None
See application file for complete search history.

(56) References Cited

U.S. PATENT DOCUMENTS

| 3,561,445 A | 2/1971 | Katerndahl et al. |
| 4,820,284 A | 4/1989 | Hauri |
| (Continued) | | |

FOREIGN PATENT DOCUMENTS

| CA | 2634244 C | 6/2014 |
| CA | 2924534 C | 8/2018 |
| (Continued) | | |

OTHER PUBLICATIONS

Non-Final Office Action received for U.S. Appl. No. 16/328,640 mailed on Mar. 25, 2022, 12 pages.
(Continued)

*Primary Examiner* — Richard C Gurtowski
(74) *Attorney, Agent, or Firm* — EMD Millipore Corporation (57) ABSTRACT

Port protection device particularly suited for an encapsulated filter unit. In certain embodiments, the protection device comprises a main body defining an internal region configured to receive a port or the like protruding from an encapsulated filter. In certain embodiments, the main body includes a slot that allows for easy removal of the protection device from the port or the like. A tube management system may be provided to receive and hold tubing. One suitable tube management system includes two spaced tangs that extend from the main body of the protection device and are configured to cooperatively receive and hold tubing between them.

15 Claims, 6 Drawing Sheets

Related U.S. Application Data (60) Provisional application No. 62/410,580, filed on Oct. 20, 2016.

(56) References Cited

U.S. PATENT DOCUMENTS

| | | | |
|---|---|---|---|
| 5,121,894 | A | 6/1992 | Twork et al. |
| 5,161,773 | A | 11/1992 | Tower |
| 5,480,197 | A * | 1/1996 | Ernst .............. E05C 19/14 292/113 |
| 5,730,724 | A | 3/1998 | Plishka et al. |
| 5,882,047 | A | 3/1999 | Ostrander et al. |
| 6,334,242 | B1 | 1/2002 | Scollard et al. |
| 6,792,925 | B2 | 9/2004 | Dworatzek et al. |
| 8,075,530 | B2 | 12/2011 | Taylor et al. |
| 8,088,291 | B2 | 1/2012 | Hershberger et al. |
| 8,647,310 | B2 | 2/2014 | Fangrow et al. |
| 8,679,090 | B2 | 3/2014 | Anderson et al. |
| 8,827,977 | B2 | 9/2014 | Fangrow |
| 9,309,020 | B2 | 4/2016 | Helmerson et al. |
| 2001/0027941 | A1 * | 10/2001 | Assmann .............. B01D 29/21 210/430 |
| 2002/0133136 | A9 | 9/2002 | Lolachi et al. |
| 2005/0053500 | A1 * | 3/2005 | Suzuki .............. F16F 15/04 417/423.15 |
| 2006/0254962 | A1 * | 11/2006 | Samsoondar ...... A61B 5/14557 210/85 |
| 2008/0185305 | A1 | 8/2008 | Roesler |
| 2009/0070966 | A1 | 3/2009 | Gohlke et al. |
| 2010/0049157 | A1 | 2/2010 | Fangrow |
| 2011/0210221 | A1 | 9/2011 | Mulzer |
| 2011/0247974 | A1 | 10/2011 | Gale et al. |
| 2013/0338608 | A1 | 12/2013 | Moorehead et al. |
| 2014/0124528 | A1 | 5/2014 | Fangrow |
| 2015/0096445 | A1 | 4/2015 | Bennett et al. |
| 2015/0121676 | A1 | 5/2015 | Feige et al. |

FOREIGN PATENT DOCUMENTS

| | | |
|---|---|---|
| CN | 1167477 C | 9/2004 |
| CN | 2646535 Y | 10/2004 |
| CN | 1313760 C | 5/2007 |
| CN | 101500637 B | 12/2012 |
| CN | 101547674 B | 7/2013 |
| CN | 101588780 B | 5/2014 |
| CN | 205001662 U | 1/2016 |
| CN | 205654978 U | 10/2016 |
| CN | 104474611 B | 10/2017 |
| EP | 0757565 B1 | 2/1997 |
| EP | 1998836 B1 | 12/2010 |
| EP | 2957803 A1 | 12/2015 |
| ES | 2201122 T3 | 3/2004 |
| ES | 2220314 T3 | 12/2004 |
| GB | 785300 A | 10/1957 |
| GB | 1001779 A | 8/1965 |
| JP | S62-531 A | 1/1987 |
| JP | H01-189304 A | 7/1989 |
| JP | 2013-163014 A | 8/2013 |
| KR | 2006-0113686 A | 11/2006 |
| WO | 2006/138151 A2 | 12/2006 |
| WO | 2018/075142 A1 | 4/2018 |

OTHER PUBLICATIONS

Corrected Notice of Allowability received for U.S. Appl. No. 16/328,640, mailed on Nov. 25, 2022, 6 Pages.
Final Office Action Received for U.S. Appl. No. 16/328,640, mailed on Jul. 28, 2022, 11 Pages.
Notice of Allowance received for U.S. Appl. No. 16/328,640, mailed on Nov. 10, 2022, 9 Pages.
International Preliminary Report on Patentability for International Application No. PCT/US2017/049075 mailed on May 2, 2019, 6 pages.
International Search Report and Written Opinion received for PCT Application No. PCT/US2017/049075, mailed on Nov. 20, 2017, 6 pages.
U.S. Appl. No. 16/328,640, filed Feb. 26, 2019, Issued.

* cited by examiner

FIG. 6

VALVE PROTECTION AND TUBE MANAGEMENT DEVICE

CROSS-REFERENCE TO RELATED APPLICATIONS

The present application is a continuation of U.S. patent application Ser. No. 16/328,640, filed on Feb. 26, 2019, which is a US National Stage application of International Application No. PCT/US2017/049075, filed on Aug. 29, 2017, which claims the benefit of priority of U.S. Provisional Application Ser. No. 62/410,580 filed on Oct. 20, 2016, the disclosure of each of which are incorporated herein by reference in their entirety.

BACKGROUND

Encapsulated filters are typically contained in a housing and have one or more ports or vents that extend outwardly from the housing. This can cause issues during shipment of the product, especially when the product is itself enclosed in packaging material, such as shrink wrap or the like, that conforms to the shape of the product. The ports or vents can penetrate through the packaging material, and can result in breakage and/or contamination of the product.

For example, MILLIPAK® disposable or single-use filter units are stacked disc filters designed for the removal of particles and microorganisms from liquids and gases, and are commercially available from the instant assignee, EMD Millipore Corporation. Often such units are supplied sterile and have undergone integrity tested during manufacture to guarantee integrity. The housing containing the stacked disc filters may be made of polycarbonate, for example. The units may have an inlet port and an outlet port for the flow of fluid through the housing. Vent and other ports may also be present.

Ports, vents or valves often protrude out from the main body of such encapsulated filter units for ergonomic reasons and these may become damaged or cause damage to the final packaging or cause damage to other items connected to the encapsulated filter such as liquid containing bag constructed of plastic film.

An additional problem with such devices is the tubing that can accompany the product. Tubing can be susceptible to kinking, which can interfere with use of the device. If the tubing is kinked during sterilization such as with an autoclave or by means of radiation, the tubing may cross-link during sterilization, and the kinked section of the tubing will seal to itself rendering the product useless.

It therefore would be desirable to provide protection for such protruding members of encapsulated filter housings, and to provide tube management to minimize or prevent tube kinking, and/or to minimize or prevent tube cross-linking during sterilization processes.

SUMMARY

The problems of the prior art have been overcome by the embodiments disclosed herein, which relate to a port protection device particularly suited for an encapsulated filter unit. In certain embodiments, the protection device comprises a main body defining an internal region configured to receive at least a portion of a port or the like protruding from an encapsulated filter body or housing. In certain embodiments, the main body includes a slot that allows for easy removal of the protection device from the port or the like. In certain embodiments, a tube management system is associated with the port protection device and is provided to receive, hold and/or orient tubing. One suitable tube management system includes two spaced tangs that extend from the main body of the protection device and are configured to cooperatively receive and grasp tubing between them. Another tube management system includes spaced C-shaped holders that are configured to receive tubing. Yet another tube management system includes a bellows that is configured to receive flexible tubing and which is flexible so that a user can positon the tubing in a desired orientation.

DETAILED DESCRIPTION

A more complete understanding of the components, processes and devices disclosed herein can be obtained by reference to the accompanying drawings. The figures are merely schematic representations based on convenience and the ease of demonstrating the present disclosure, and is, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

Figure 1:
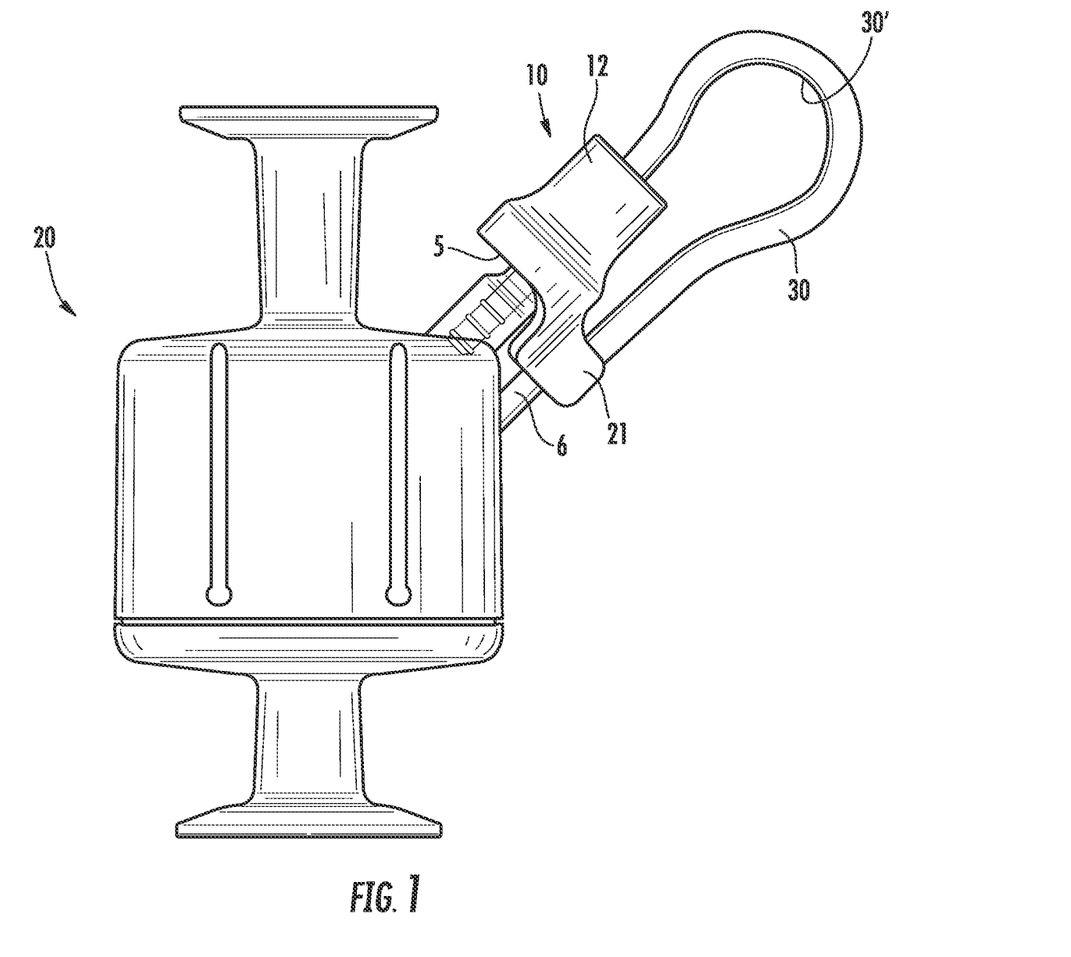
FIG. 1 is a perspective view of an encapsulated filter housing having a vent and a protection device positioned to protect the vent in accordance with certain embodiments.
Figure 2:
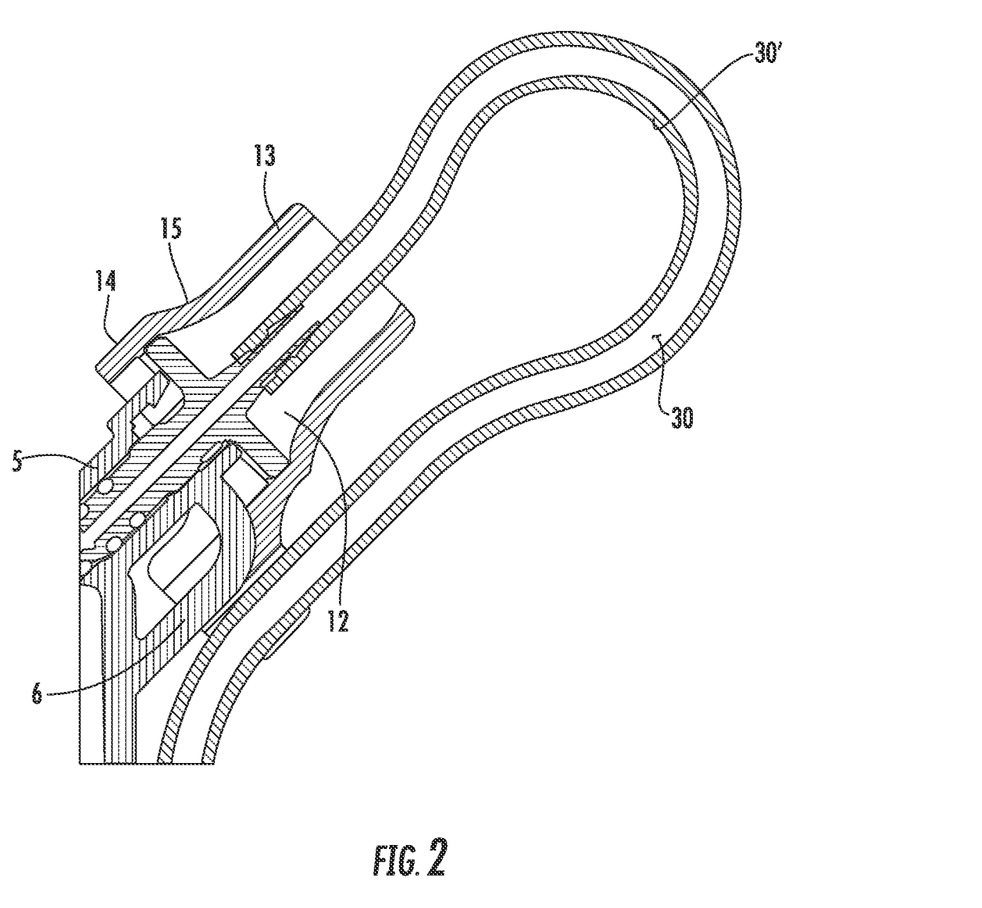
FIG. 2 is a cross-sectional view of a protection device positioned on a vent and shown managing tubing in accordance with certain embodiments.
Figure 3:
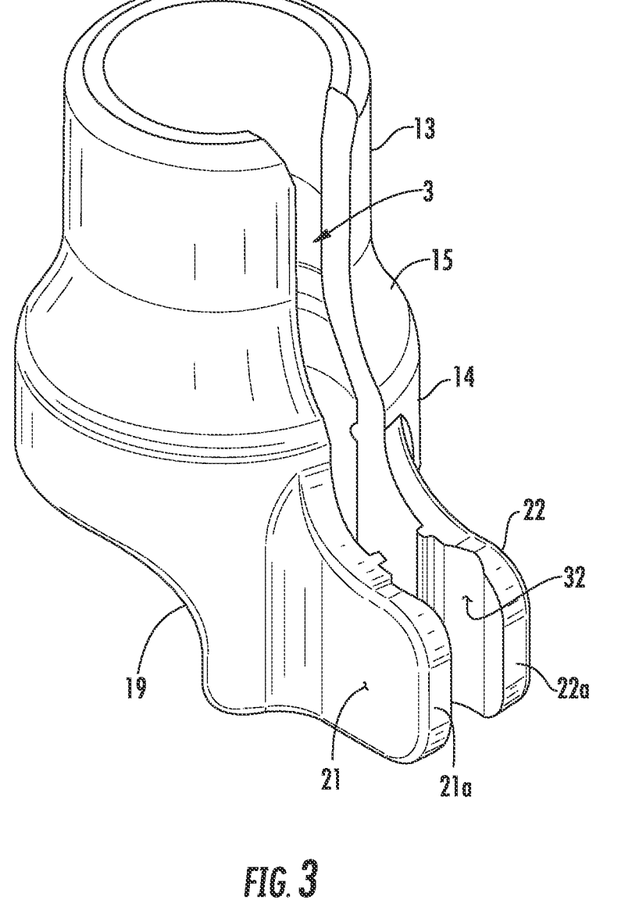
FIG. 3 is a perspective view of a protection device in accordance with certain embodiments.

Turning first to FIGS. 1-3, there is shown an encapsulated filter port protection device 10 in accordance with certain embodiments. In FIG. 1, the device 10 is shown in place on a port 5 of an encapsulated filter 20. In the embodiment shown, the port 5, which can be a valve such as a bleed valve or a vent, for example, protrudes from the body of the encapsulated filter 20 for ergonomic reasons and presents a surface that than be damaged during packaging and/or shipping, and/or can cause damage to the packaging, rendering the product ineffective. For example, the port 5 may have a free end that is sharp and can penetrate through packaging. In some embodiments the port is generally cylindrical, although the port protection device of the embodiments disclosed herein can be used to protect protrusions having other shapes.

In certain embodiments, the device 10 includes a main body 12. In the embodiment shown, the main body 12 includes an outer wall that defines an interior volume configured to receive at least a portion of port 5 of an encapsulated filter 20, for example. In certain embodiments, the outer wall is discontinuous: there is a slot 3 (FIG. 3) formed axially in the outer wall that provides the main body 12 with some flexibility for easy attachment and removal from the port 5. The slot 3 may be dimensioned and positioned to receive a vent hook 6 or other detail which protrudes from port 5 should one be present on the encapsulated filter 20. The interior volume of the main body 12 should be sufficient to receive at least a portion of the port 5, and thus should have an interior diameter larger than the largest exterior diameter of the port 5. In some embodiments, the interior volume of the main body 12 is dimensioned to receive substantially the entire length of the port 5. In other embodiments, the interior volume of the main body 12 is dimensioned to cover or surround only the top portion of the port 5 (FIG. 1).

In some embodiments, the main body 12 includes an upper region 13 that is generally cylindrical, and has a constant or substantially constant interior diameter. In some embodiments, the main body 12 includes a lower region 14 that is also generally cylindrical, and has a constant or substantially constant interior diameter that is larger than the constant or substantially constant diameter of the upper region 13. There also may be a region of transition 15 between the upper region 13 and the lower region 14 that has an internal diameter that gradually increases from the upper region 13 towards the lower region 14.

In certain embodiments, the device 10 may include a tube management system. For example, in some embodiments a pair of spaced tangs 21, 22 extend from the main body 12 and are positioned and configured to manage a tube extending from the port to which the device 10 is protecting. The spaced tangs 21, 22 function to manage tubing, typically flexible cylindrical plastic tubing. If the tubing kinked when the product is subject to sterilization such as with an autoclave, the tubing can be cross-linked during sterilization, rendering the tubing and the device useless. The spaced tangs 21, 22 are configured to hold or grasp tubing 30 or the like between them, creating points of contact with the tubing 30 to hold the contacted points of the tubing 30 in place and minimize or prevent the tubing 30 from kinking. Preventing kinking of the tubing avoids compromising the tubing integrity and/or reduces or eliminates any deleterious cross-linking during sterilization procedures. In some embodiments there are at least two points of contact. In some embodiments the tubing 30 may be slidable while in the grasp of the tangs 21, 22 to allow for further positioning, for example, for increasing or decreasing the size of loop 30' seen in FIG. 2. In addition, the tangs 21, 22 help in managing the positioning or orientation of the tubing 30 so that it is not in the way of the user and does not interfere with the filtration process.

In certain embodiments, each tang 21, 22 extends radially outwardly from the main body 12, and a portion of each tang extends axially from the open bottom end 19 of the main body 12. Each tang 21, 22 may terminate in a respective free end 21a, 22a. In some embodiments, each tang 21, 22 includes an inner surface having an arcuate cut-out 31, 32 (only cut-out 32 is visible in FIG. 3) configured to receive the tubing 30. Each arcuate cut-out 31, 32 is preferably located proximate to the free end 21a, 22a, and the cut-outs 31, 32 oppose one another and cooperate to receive and hold the outer surface of a tube 30, such as a flexible cylindrical tube. In some embodiments the space between the cut-outs 31, 32 is slightly smaller than the outside diameter of the tube 30, so that when the tangs 21, 22 are in a relaxed position, they cooperate to hold the tube 30, thereby requiring an external force (e.g., a force applied radially) to slide the tube 30 while in their grasp or to completely release the tube 30 from their grasp.

Figure 4:
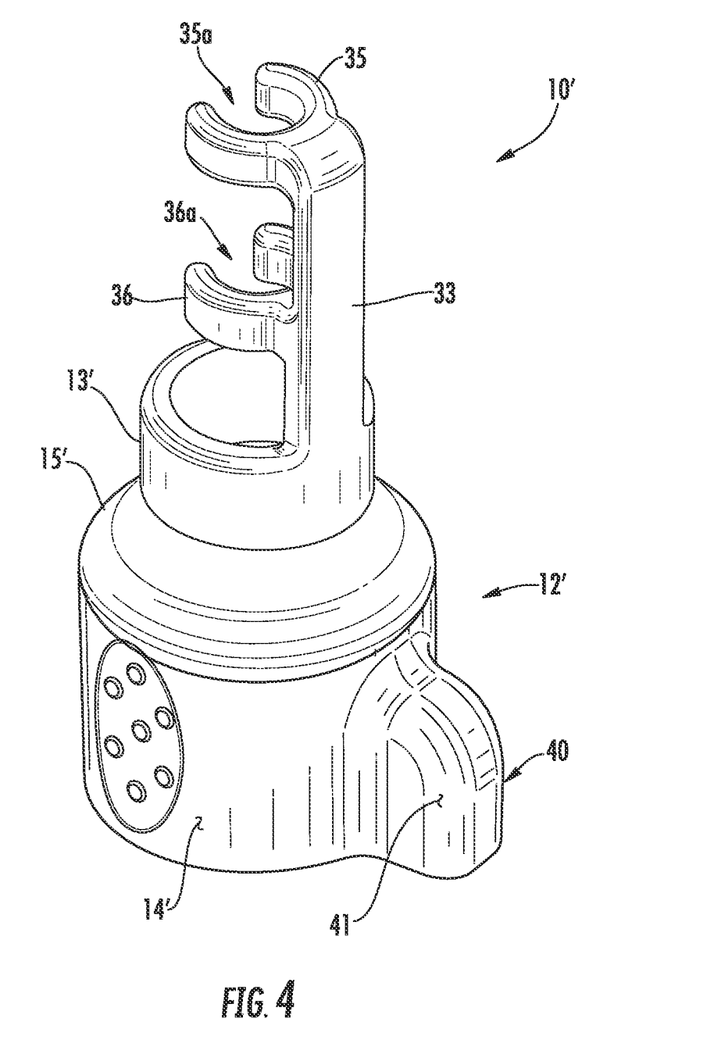
FIG. 4 is a perspective view of a first alternative embodiment of a protection device.

FIG. 4 shows an alternative embodiment of a protection device 10'. The device 10' includes a main body 12'. In the embodiment shown, the main body 12' includes an outer wall that defines an interior volume configured to receive a port 5 of an encapsulated filter 20 (FIG. 1). In some embodiments, the main body 12' includes an upper region 13' that is generally cylindrical, and has a constant or substantially constant interior diameter. In some embodiments, the main body 12' includes a lower region 14 that is also generally cylindrical, and has a constant or substantially constant interior diameter that is larger than the constant or substantially constant diameter of the upper region 13'. There also may be a region of transition 15' between the upper region 13' and the lower region 14' that has an internal diameter that gradually increases from the upper region 13' towards the lower region 14".

In some embodiments, extending axially from the main body 12' are one or more generally C-shaped tube holders 35, 36 that are supported on stem 33. Where more than one generally C-shaped tube holders are present on the stem 33, they are preferably spaced from each other. In some embodiments, each of the one or more C-shaped tube holders 35, 36 has a gap 35a, 36a to allow for insertion of a tube to the internal region defined by the C-shaped tube holders 35, 36. Preferably each gap 35a, 36a is dimensioned such that manual force is necessary to insert and remove the tube 30 from the internal region. As a result, once a tube 30 is inserted to the internal region, it is retained therein until the user removes it. In some embodiments, the stem 33 is made thin enough to have flexibility, allowing it to bend in order to orient the tube 30 as desired.

In certain embodiments, the protection device 10' may include a nose 40 that extends radially outwardly from the main body 12'. In some embodiments the nose 40 is formed by a curved outer wall 41 that defines an interior cavity configured to receive a vent hook 6 (FIG. 2) or the like present on an encapsulated filter 20, and functions to help prevent premature activation of the vent.

Figure 5:
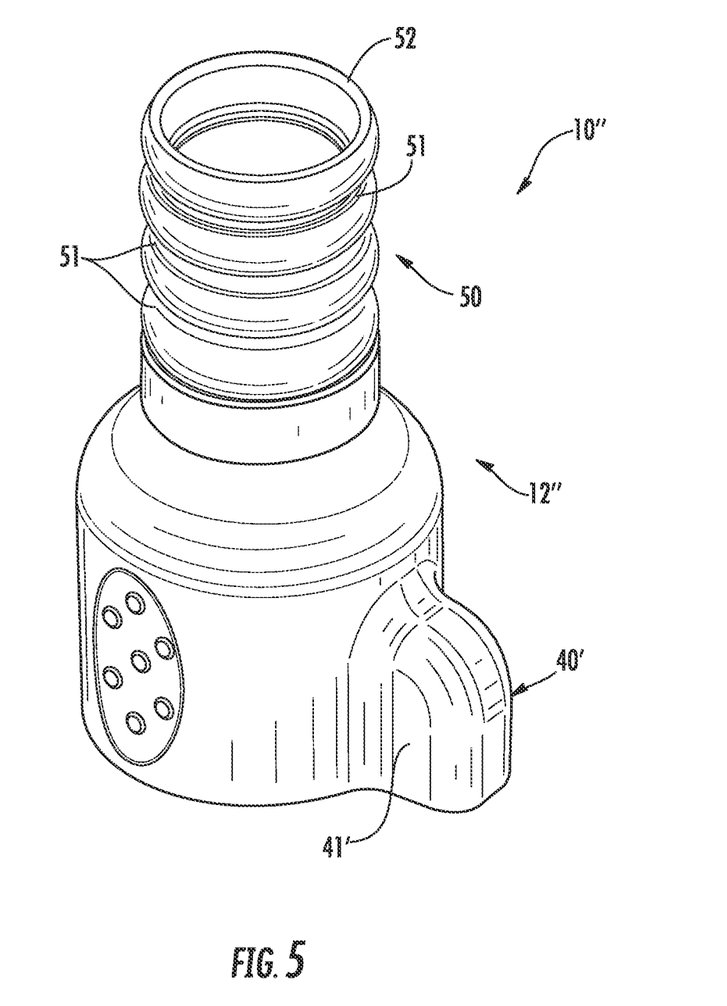
FIG. 5 is a perspective view of a second alternative embodiment of a protection device.

FIG. 5 illustrates yet another embodiment of a protection device 10". In this embodiment, the main body 12" is similar to that of the embodiment of FIG. 4, but instead of the one or more C-shaped tube holders 35, 36, there is an axially extending bellows 50. The bellows 50 has an open end 52 and a plurality of folds or corrugations 51a-51n that impart flexibility to the bellows 50 and allow the bellows 50 to bend or flex relative to the main body 12". The bellows 50 defines an interior region that can contain a tube 30, which will extend out the open end 52 and can be positioned as wanted by flexing the bellows 50 accordingly.

In certain embodiments, the protection device 10" may include a nose 40' that extends radially outwardly from the main body 12". The nose 40' is formed by an outer wall 41' that defines an interior cavity configured to receive a vent hook 6 (FIG. 2) or other detail that protrudes from the port 5 present on an encapsulated filter housing, and functions to help prevent premature activation of the vent.

Figure 6:
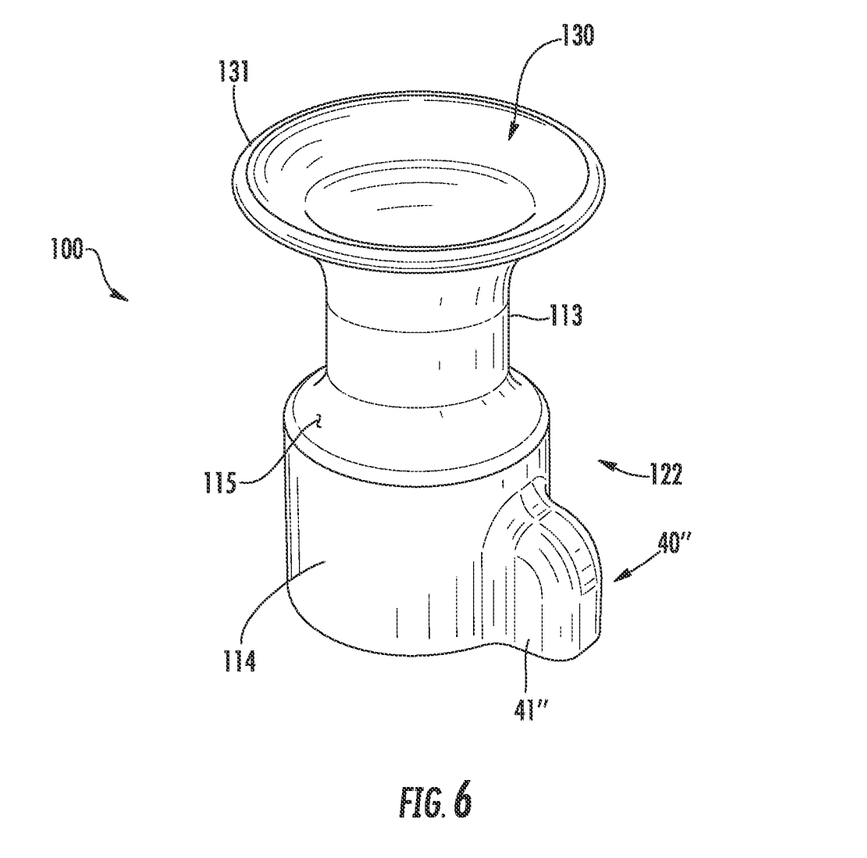
FIG. 6 is a perspective view of a third alternative embodiment of a protection device.

FIG. 6 illustrates yet a further embodiment of a protection device 100 somewhat similar to that of FIG. 5, but instead of a bellows, the top has a horn shape with a flared opening 130. The device 100 includes a main body 112 including an upper region 113 that is generally cylindrical, and has a constant or substantially constant interior diameter. In some embodiments, the main body 112 includes a lower region 114 that is also generally cylindrical, and has a constant or substantially constant interior diameter that is larger than the constant or substantially constant diameter of the upper region 113. There also may be a region of transition 115 between the upper region 113 and the lower region 114 that has an internal diameter that gradually increases from the upper region 113 towards the lower region 114.

The upper region 113 terminates in the flared opening 130, which comprises regions of increasing diameter, reaching a maximum diameter at the free end 131. The flared opening 130 is configured to provide a large enough radius to prevent kinking of tube 30 that extends through the flared opening when in the assembled condition.

In certain embodiments, the protection device 100 may include a nose 40" that extends radially outwardly from the main body 122. The nose 40" is formed by an outer wall 41" that defines an interior cavity configured to receive a vent hook 6 (FIG. 2) or other detail that protrudes from the port 5 present on an encapsulated filter housing, and functions to help prevent premature activation of the vent.

What is claimed is:

1. An encapsulated filter port protection device, comprising:
   a main body defining an open region for receiving a filtration housing port having a first diameter; and
   a bellows extending coaxially from the main body and configured to receive flexible tubing, the bellows including a plurality of corrugations that are configured to impart flexibility of the bellows such that the bellows are configured to bend or flex relative to the main body and reorient a free end of the bellows with respect to the main body, wherein the bellows has a maximum diameter that is smaller than the first diameter of the main body.

2. The encapsulated filter port protection device of claim 1, wherein the bellows defines an interior region and an open end, and wherein the flexible tubing extends through the interior region and out of the open end.

3. The encapsulated filter port protection device of claim 1, wherein the open region is substantially cylindrical.

4. The encapsulated filter port protection device of claim 1, wherein the main body has an upper region having a first internal diameter, and a lower region having a second internal diameter that is greater than the first internal diameter.

5. The encapsulated filter port protection device of claim 4, wherein the main body has an intermediate region between the upper region and the lower region that transitions between the first internal diameter and second internal diameter.

6. The encapsulated filter port protection device of claim 1, wherein the main body includes a nose that extends radially outwardly from the main body, the nose being configured to receive a vent hook of an encapsulated filter.

7. An encapsulated filter port protection device, comprising:
   a main body defining an open region for receiving a filtration housing port; and
   a horn-shaped open end extending from the main body and configured to receive flexible tubing, wherein the horn-shaped open end defines a cylindrical flared opening having regions of increasing inner and outer diameters that include a maximum inner diameter and a maximum outer diameter at a free end of the horn-shaped open end.

8. The encapsulated filter port protection device of claim 7, wherein the horn-shaped open end includes a proximal end, which is coupled to the main body, and the free end is opposite the proximal end, which is spaced from the main body.

9. The encapsulated filter port protection device of claim 7, wherein the free end of the horn-shaped open end is configured to prevent kinking of the flexible tubing that extends through the horn-shaped open end.

10. The encapsulated filter port protection device of claim 7, wherein the open region is substantially cylindrical.

11. The encapsulated filter port protection device of claim 7, wherein the main body has an upper region having a first internal diameter, and a lower region having a second internal diameter that is greater than the first internal diameter.

12. The encapsulated filter port protection device of claim 11, wherein the main body has an intermediate region between the upper region and the lower region that transitions between the first internal diameter and second internal diameter.

13. The encapsulated filter port protection device of claim 7, wherein the main body includes a nose that extends radially outwardly from the main body, the nose being configured to receive a vent hook of an encapsulated filter.

14. The encapsulated filter port protection device of claim 7, wherein the horn-shaped open end is disposed axially above said main body.

15. The encapsulated filter port protection device of claim 1, wherein the bellows extends coaxially from the main body along a central axis extending through the main body and the bellows, and wherein each corrugation of the plurality of corrugations is oriented perpendicular to the central axis.

* * * * *